Dec. 18, 1951  B. ZAIKOSKI  2,578,874
FISHING FLOAT
Filed July 14, 1950
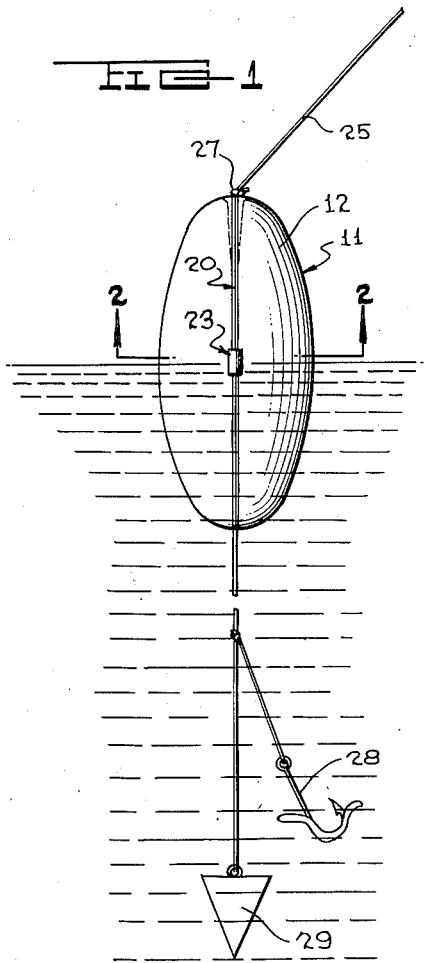
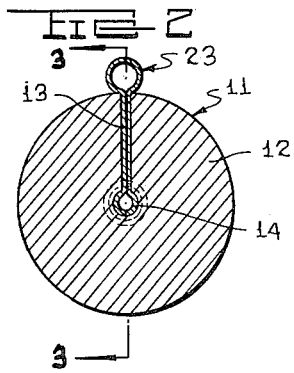
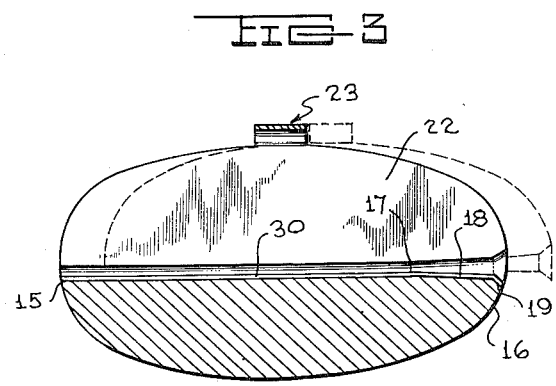
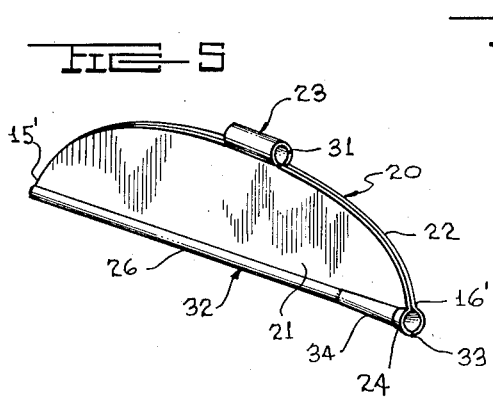
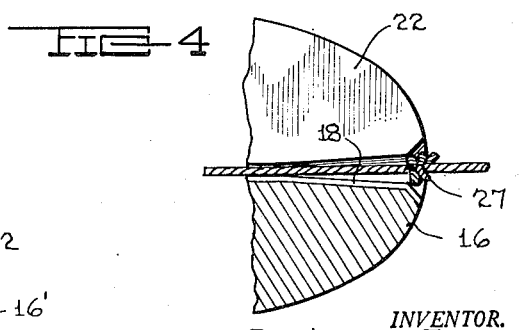
INVENTOR.
BERNARD ZAIKOSKI
BY
McMorrow, Berman & Davidson
ATTORNEYS Patented Dec. 18, 1951

2,578,874

UNITED STATES PATENT OFFICE 2,578,874

FISHING FLOAT

Bernard Zaikoski, St. Petersburg, Fla.

Application July 14, 1950, Serial No. 173,896

3 Claims. (Cl. 43—44.9)

The present invention relates to a fishing float.

An object of the present invention is to provide a fishing float which may be readily applied to and removed from a line.

Another object of the present invention is to provide a fishing float which is highly efficient in action, and simple of structure.

Further objects will appear as the description proceeds and referring to the accompanying drawings wherein:

Figure 1 is an elevational view of the float according to the present invention applied to a line with hook and sinker;

Figure 2 is a sectional view taken on line 2—2 of Figure 1 with the line omitted;

Figure 3 is a sectional view on line 3—3 of Figure 2;

Figure 4 is an enlarged fragmentary sectional view of one end of the float with the line and its securing loop therein; and Figure 5 is a perspective view of the line receiving means.

Referring more particularly to the drawing wherein like reference numerals refer to like parts throughout, the fishing float of the present invention is indicated by the numeral 11 and comprises a body 12 of buoyant material having a groove 13 extending inwardly from its exterior surface between the ends 15 and 16 and terminating in a circular enlargement 14 located substantially centrally thereof. The enlargement 14 includes a circular portion 30 of the same cross sectional area throughout and extending inwardly from the end 15 and terminating at a point 17 spaced from the end 16 and outwardly flaring portion 18 of varying circular cross section extending outwardly from the said point 17 to the end 16 of the body.

Insertable in and withdrawable from the groove 13 is a line receiving and guiding means 20. The line receiving and guiding means 20 comprises a pair of plates 21, 22 arranged in face to face abutting relation and connected together along one of the edges as at 23 for movement into and out of abutting relation with respect to each other. As shown in the drawing this connection embodies a hinge in the form of a sleeve 31 integrally connected to the plates 21 and 22, the sleeve 31 serving as a handle. Positioned adjacent to and connected to the other edges of the plates 21 and 22 is a circular tube 32 having a split 33 extending longitudinally from the end 15' to the other end 16'. Said tube comprises a portion 26 of a length and cross sectional area such as to conformably fit within the circular portion 30 of the groove 13 in the body 12, and a portion 34 of a length and cross sectional area such as to conformably fit within the flaring portion 18 of the groove 13 of the body 12.

A fish line 25 is positioned in the split tube 32 so as to be slidable therethrough. A loop 27 which may be a piece of line having its ends knotted together, frictionally engages the line 25 and is slidable thereon and is wedgingly receivable in the flaring portion 34 of the split tube 32 to prevent the line from reeving through the tube. A conventional hook 28 and sinker 29 are attached to the line in any desired manner.

It will be understood that the float may be made of any suitable buoyant material such as wood or plastic material and the line receiving member may be made of any suitable material such as a plastic material or of metal.

The float is used by sliding the line receiving means 20 toward end 16 by manually grasping the handle formed by sleeve 31 and thereby removing the line receiving means. The plates 21 and 22 are separated so as to split tube 32 and a line is inserted laterally thereof without necessitating threading of the line through the tube. With the line in place, the line receiving means 20 is inserted into groove 13 by sliding said line receiving means toward end 15 of the body. It will be observed that flaring portion 34 of the split tube 32 engages section 18 of the groove to prevent the line receiving means from coming out through end 15.

The loop 27 is secured to the line between the float and a fishing rod and is received in the flaring portion 34 of the tube to prevent the float from sliding up on the line. This loop 27 is sufficiently small that it may pass through the conventional level winder of a fishing reel so that casting may be facilitated.

While I have shown and described the preferred embodiment of my invention it will be understood that minor changes in construction, combination and arrangement of parts may be made without departing from the spirit of the invention as claimed.

Having thus described my invention what I claim is:

1. A fishing float comprising a body fabricated of buoyant material and having a groove extending inwardly from its exterior surface between the ends thereof and terminating in a circular enlargement substantially centrally thereof, said enlargement comprising a circular portion of the same cross sectional area throughout and extending inwardly from one end of said body and terminating at a point spaced from the other end and an outwardly flaring portion of varying circular cross section extending outwardly from the said point to the other end of the body, a line receiving and guiding means insertable into and withdrawable from said groove, said means comprising a pair of plates arranged in face to face abutting relation and connected together along one of the edges for movement into and out of abutting relation, and a split circular tube positioned adjacent to and connected to the other edges of said plates and extending from one end to the other thereof, said tube embodying a portion of length and cross sectional area such as to conformably fit within the said circular enlargement portion of uniform cross section and a second portion of said split tube of length and cross sectional area such as to conformably fit within the said flaring portion of the enlargement.

2. A fishing float comprising a body fabricated of buoyant material and having a groove extending inwardly from its exterior surface between the ends thereof and terminating in a circular enlargement substantially centrally thereof, a line receiving and guiding means insertable into and withdrawable from said groove, said means comprising a pair of plates arranged in face to face abutting relation and connected together along one of the edges for movement into and out of abutting relation, and a split circular tube positioned adjacent to and connected to the other edges of said plates and extending from one end to the other thereof to conformably fit within the said circular enlargement.

3. A fishing float comprising a body of buoyant material having a groove extending inwardly from its exterior surface between the ends thereof and terminating in an enlargement substantially centrally thereof, a line receiving and guiding means insertable into and withdrawable from said groove comprising a pair of plates arranged in face to face abutting relation and connected together along one of the edges for movement into and out of abutting relation, and a split tube positioned adjacent to and connected to the other edges of said plates and extending from one end to the other thereof, said line receiving and guiding means being of a shape to conformably fit within the groove of said body.

BERNARD ZAIKOSKI.

REFERENCES CITED

The following references are of record in the file of this patent:

UNITED STATES PATENTS

| Number | Name | Date |
|---|---|---|
| 668,254 | Dickinson | Feb. 19, 1901 |
| 1,434,335 | Frost | Oct. 31, 1922 |
| 2,001,241 | DeVries | May 14, 1935 |
| 2,208,240 | Arnesen et al. | July 16, 1940 |